United States Patent
Hsu

(10) Patent No.: US 7,270,203 B2
(45) Date of Patent: Sep. 18, 2007

(54) ELECTRIC MACHINE FOR HYBRID MOTOR VEHICLE

(75) Inventor: John Sheungchun Hsu, Oak Ridge, TN (US)

(73) Assignee: Ut-Battelle, LLC, Oak Ridge, TN (US)

( * ) Notice: Subject to any disclaimer, the term of this patent is extended or adjusted under 35 U.S.C. 154(b) by 426 days.

(21) Appl. No.: 10/997,306

(22) Filed: Nov. 24, 2004

(65) Prior Publication Data

US 2005/0173168 A1    Aug. 11, 2005

Related U.S. Application Data

(60) Provisional application No. 60/543,069, filed on Feb. 9, 2004.

(51) Int. Cl.
*B06K 6/02* (2006.01)
(52) U.S. Cl. .............. 180/65.2; 903/906; 310/114; 310/171
(58) Field of Classification Search ............... 310/114, 310/171, 105, 106, 107, 210, 256, 266, 268, 310/166, 168, 68 B; 180/65.1, 65.2, 65.3, 180/65.4, 65.6, 65.7; 903/906, 910
See application file for complete search history.

(56) References Cited

U.S. PATENT DOCUMENTS

| | | | | |
|---|---|---|---|---|
| 3,069,577 A | * | 12/1962 | Lee | 310/166 |
| 4,785,213 A | * | 11/1988 | Satake | 310/116 |
| 4,945,296 A | * | 7/1990 | Satake | 318/538 |
| 6,251,037 B1 | * | 6/2001 | Baumgaertner et al. | 475/2 |
| 6,310,417 B1 | * | 10/2001 | Hsu | 310/112 |
| 6,833,646 B2 | * | 12/2004 | Joong et al. | 310/114 |
| 6,841,916 B2 | * | 1/2005 | Chiarenza | 310/254 |
| 6,862,887 B2 | * | 3/2005 | Noreikat et al. | 60/716 |
| 6,668,648 B2 | * | 5/2005 | Hata et al. | 180/65.2 |
| 6,891,301 B1 | * | 5/2005 | Hsu | 310/171 |
| 6,977,454 B2 | * | 12/2005 | Hsu | 310/171 |

OTHER PUBLICATIONS

Perahia, J., "Discussion of Hybrid-Secondary-Uncluttered Induction (HSU-I) Machine". IEEE Transactions on Energy Conversion, vol. 17, No. I, Mar. 2002, pp. 150-151.
Hsu, John S., "Hybrid-Secondary-Uncluttered Induction (HSU-I) Machine", IEEE Transactions on Energy Conversion, vol. 16, No. 2, Jun. 2001, pp. 192-197.

* cited by examiner

*Primary Examiner*—Christopher P. Ellis
*Assistant Examiner*—John D Walters
(74) *Attorney, Agent, or Firm*—Kirk A. Wilson

(57) ABSTRACT

A power system for a motor vehicle having an internal combustion engine and an electric machine is disclosed. The electric machine has a stator, a permanent magnet rotor, an uncluttered rotor spaced from the permanent magnet rotor, and at least one secondary core assembly. The power system also has a gearing arrangement for coupling the internal combustion engine to wheels on the vehicle thereby providing a means for the electric machine to both power assist and brake in relation to the output of the internal combustion engine.

10 Claims, 4 Drawing Sheets

MODE 1: STARTING ENGINE

MODE 2: TWO TORQUES PROVIDED BY PM ELECTRIC MACHINE

MODE 3: MOTORING, GENERATING AND FIELD WEAKENING MODES

MODE 4: DE-COUPLING MODE FOR PM MACHINE

ELECTRIC MACHINE FOR HYBRID MOTOR VEHICLE

CROSS REFERENCE TO RELATED APPLICATIONS

This application claims priority to U.S. Provisional Patent Application 60/543,069 filed Feb. 9, 2004, and is herein incorporated by reference.

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is electric machines for use in association with an internal combustion engine in a hybrid motor vehicle.

DESCRIPTION OF THE BACKGROUND ART

Hsu, U.S. Pat. No. 6,310,417, issued Oct. 30, 2001, disclosed an electric machine with uncluttered rotor magnetic coupling that has a significant potential to lower the cost of adjustable-speed drives. In addition to speed control below synchronous speed, this machine may also be operated above synchronous speed.

The term "uncluttered coupling" relates to a stator and rotor that couple slip energy. In an induction motor, the speed of the rotating stator field equals the sum of 1) the speed of the rotating rotor field plus 2) the mechanical rotation speed of the rotor. With the motor running at maximum torque and close to synchronous speed, rotor speed is high and slip (the difference between the speed of the rotating stator field and the rotational speed of the rotor) is small, about 3 to 10 per cent, and the slip frequency induced in the rotor is small, perhaps two to six cycles per second for a 60 Hz motor.

To couple only slip energy, the stator and rotor have coils that run circumferentially, sometimes referred to as "peripherally," around the axis of rotor rotation. The peripheral coils of the rotor and stator are magnetically coupled. The rotor coil rotates and carries a slip-frequency current. Because the rotation does not change the total magnetic flux linking both the rotor and stator coils, no electromotive force (emf) is induced in the stator coil due to the rotation of the rotor coil. This "uncluttered coupling" allows only the slip energy power corresponding to the slip-frequency currents to be transferred between the rotor and stator coils of the transformer.

Hsu, U.S. Pat. Appl. Ser. No. 10/706,577, filed Nov. 12, 2003, disclosed an uncluttered machine with an additional PM rotor carrying permanent magnet material. This machine is capable of setting up torques and counter torques due to the reaction of the uncluttered rotor to the PM rotor.

It is desired to make such a machine that is applicable to the hybrid motor vehicle that uses both an electric machine and an internal combustion engine.

SUMMARY OF THE INVENTION

This invention provides a multiple-rotor permanent-magnet (PM) machine with a rotor that couples a slip flux to one or more secondary coils through a magnetic coupling rotor.

The invention further relates to an electric machine that is coupled to the internal combustion engine and the wheels of the vehicle through a gearing arrangement.

Various objects and advantages of the invention will be apparent to those of ordinary skill in the art from the description of the preferred embodiments which follow. In the description, reference is made to the accompanying drawings, which form a part hereof, and which illustrate examples of the invention.

DETAILED DESCRIPTION OF THE PREFERRED EMBODIMENTS

Figure 1:
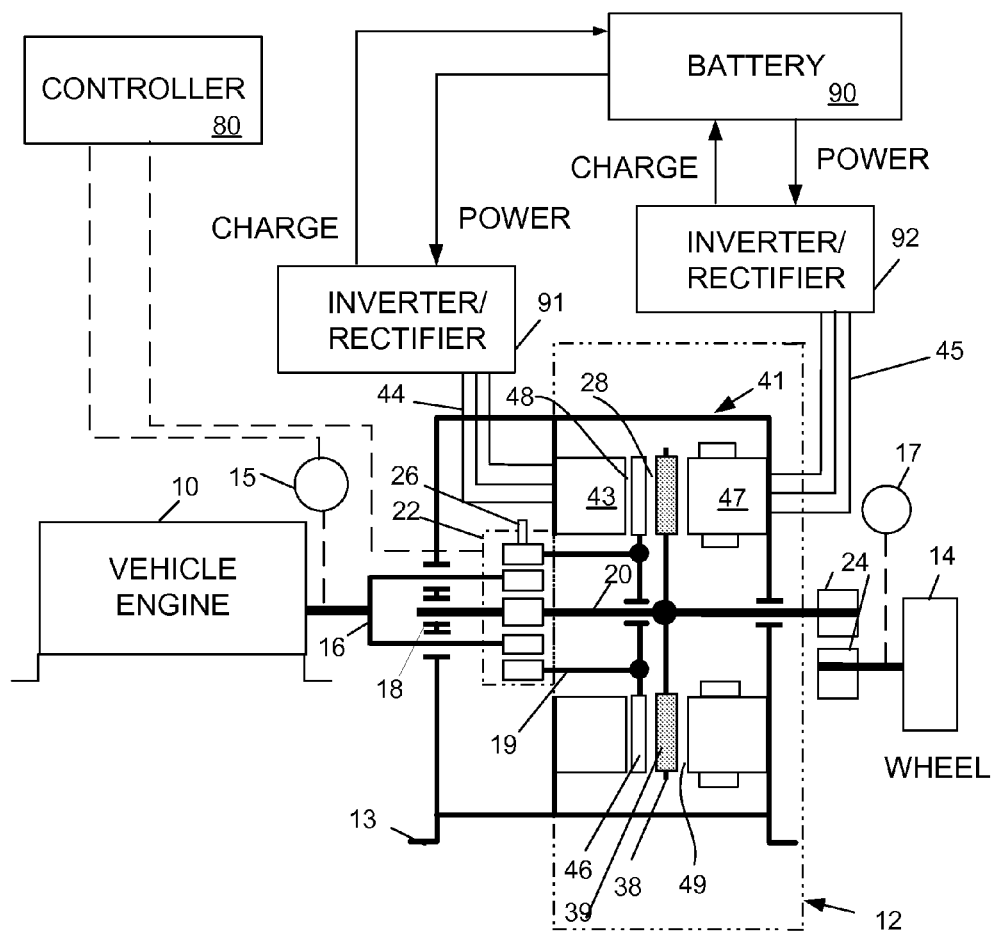
FIG. 1 is a schematic view of a hybrid vehicle that includes an internal combustion engine and an electric machine of the present invention.

FIG. 1 illustrates power system for a hybrid electric vehicle including a vehicle engine 10 (an internal combustion engine), and an electric machine 12, which are coupled and uncoupled to drive the wheels 14 of a vehicle. The vehicle engine 10 is coupled to the wheels 14 through a hollow shaft 16 and a main drive shaft 20, which are coupled to each other through a planetary gearing assembly 22. Both shafts 16, 20 are supported at various points by suitable bearings including bearings 18. The main drive shaft 20 may also be coupled to the wheels 14 at the driving end through suitable gearing 24.

The electric machine 12 is an uncluttered PM machine which has been previously disclosed in Hsu, U.S. Pat. Appl. No. 10/706,577, filed Nov. 12, 2003, the disclosure of which is incorporated herein by reference. This machine provides a housing 41, an armature or stator 47, and a secondary core assembly 43. The stator 47 receives multi-phase electric power through lines 45 connecting to multi-turn windings. The secondary coil assembly 43 receives multi-phase electric power through lines 44 The toroidal secondary core assembly 43 has peripherally disposed windings which encircle the main drive shaft 20 and the hollow drive, shaft 16. The machine 12 also includes a first, uncluttered rotor 46 coupled to a ring gear 23 (seen in FIG. 2) in the planetary gear set 22 via the hollow shaft 19. A second rotor 38 carrying permanent magnets 39 is positioned between a stator 47 and the first rotor 46. The PM rotor 38 is mounted for rotation with the main drive shaft 20. A first axial air gap 49 relative to the rotor shafts, 16, 19, 20 is located between the stator 47 and the PM rotor 38. A second axial air gap 28 is provided between the PM rotor 38 and the uncluttered rotor 46. And, a third axial air gap 48 is provided between the first rotor 46 and the secondary core and coil assembly

43. The uncluttered rotor 46 rotates with the hollow shaft 19 and has non-contact magnetic brushes for conducting flux.

A battery 90 is connected to an inverter/rectifier 91 to supply power to, and to be charged from the secondary core assembly 43. The battery 90 is also connected to an inverter/rectifier 92 to supply power to, and to be charged from, the stator 47. The battery 90 can supply power to the assemblies 43, 47 on either side of the air gap region and can receive power from the assemblies 43, 47 on either side of the air gap region.

Speed sensors 15 and 17 are provided for sensing the speed of the internal combustion engine 10 and the wheels. A speed sensor is also provided in gear set 22 for sensing the speed of the uncluttered rotor 46. These speed signals are sent to a controller 80, which has the ability under certain conditions to move pin 26 into and out of engagement between a fixed member and the ring gear 23 so as to fix the position of the ring gear 23 or allow it to rotate.

Figure 2:
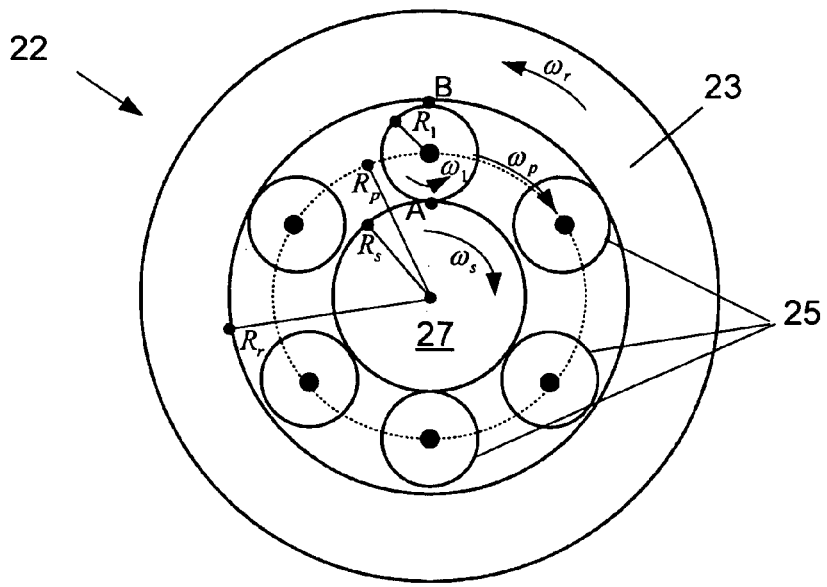
FIG. 2 is a schematic view of a planetary gearing arrangement seen in FIG. 1.

As shown in FIGS. 1 and 2, the outside or ring gear 23 (denoted by the "r" subscript in the following equations) is coupled to the electric motor/generator of the present invention. The planetary gears 25 (denoted as a group by the "p" subscript and individually by the "1" subscript) are coupled to the internal combustion engine 10 through the hollow drive shaft 16. The sun gear 27 (denoted by the "s" subscript) is coupled to the wheels 14 through the main drive shaft 20. In FIG. 2 and in the following equations, the radius of the these gears is denoted by "R" and the angular velocity is denoted by "ω".

For point A on the outer circumference of sun gear 27 in FIG. 2, the following relationship applies:

$$\omega_s \cdot R_s = \omega_1 \cdot R_1 + \omega_p \cdot (R_p - R_1) \quad 1)$$

For point B on the inner circumference of ring gear 23 in FIG. 2, the following relationship applies:

$$\omega_r \cdot R_r = \omega_1 \cdot R_1 - \omega_p \cdot (R_p + R_1) \quad 2)$$

Solving for $\omega_s$ provides the following expressions:

$$\omega_s = \frac{2 \cdot \omega_p \cdot R_p + \omega_r \cdot R_r}{R_s} \quad 3)$$

$$\omega_r = \frac{-2 \cdot \omega_p \cdot R_p + \omega_s \cdot R_s}{R_r} \quad 4)$$

In the above equation 4) the minus sign signifies a direction opposite the positive direction.

The speed of the wheels, which corresponds to the rotational speed of the sun gear, $\omega_s$, can be controlled from both the stator 43 and secondary 47 of the machine of the present invention, with or without power to the wheels from the internal combustion engine.

The speed relationships are further expressed by the following equations. When the following expressions are true:

$$\omega_s = 2 \cdot \omega_p \cdot \frac{R_p}{R_s} \text{ or } \frac{\omega_s}{\omega_p} = 2 \cdot \frac{R_p}{R_s} \quad 5)$$

the speed of the wheels, $\omega_s$, is more than twice the speed of the engine speed, $\omega_p$, and when the ring gear speed, $\omega_r$, is zero, a locking pin 26 (FIG. 1) can be inserted in the ring gear 23 to allow not supplying electric power to the electric motor/generator 12 at high vehicle speeds. The pin 26 can be disengaged by operating the motor/generator 12 so as to counter any forces on the pin 26 prior to disengagement.

The object of the arrangement is to allow utilization the electric motor/generator at the entire speed range to be in motor, generator, and/or field weakening modes.

Figure 3A:
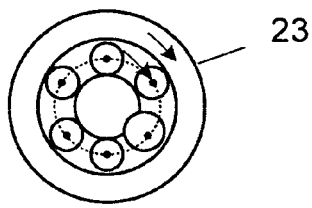
FIGS. 3a-3d are schematics of the planetary gearing in several modes of operation.

As seen in FIG. 3*a*, when the engine is being started, the ring gear is driven in a clockwise direction by the planetary gears 25 coupled to the engine via the hollow shaft 16. The stationary sun gear 27 helps to make the engine start in a clockwise direction.

Figure 3B:
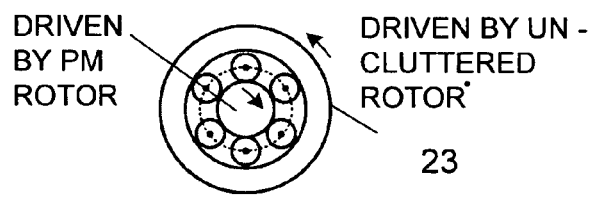

As seen in FIG. 3*b*, when the PM rotor 38 begins to rotate, it produces a torque on the sun gear 27 which aids the torque supplied to the wheels through the planetary gear set 25. The rotation of the PM rotor sets up a counter torque (represented by the counterclockwise arrow in FIG. 3*b*) in the uncluttered rotor which drives the ring gear 23, but this torque aids the planetary gear set 25 in traveling around the sun gear 27, which is also rotating in the direction of travel of the planetary gear set 25. Thus, the torques from both the uncluttered rotor 46 and the PM rotor 38 combine to provide power to aid the drive provided by the internal combustion engine 10 to the wheels 14.

Figure 3C:
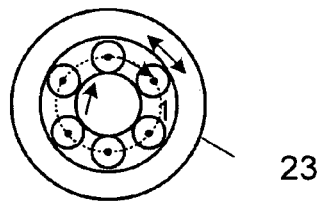

As seen in FIG. 3*c*, when the vehicle reaches its middle speed range, the electric machine can be operated in a motoring mode, a regenerative braking mode or in a field weakening mode for operation above synchronous speed, as represented by the bi-directional arrow in the ring gear 23. Field weakening can be provided to one or both sides.

Figure 3D:
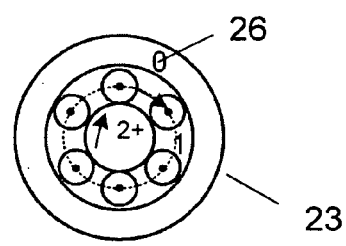

As represented in FIG. 3*d*, the ring gear 23 can be de-coupled from moving by inserting a lock pin 26. This effectively takes the PM rotor and the electric machine out of the power system, which may be desirable at very high speed, to conserve the energy that would otherwise be consumed to operate the electric machine.

Referring to FIGS. 4*a*-4*c* and 5*a*-5*b*, the details of the rotors 46, 38 in the PM machine 12 will now be described. The uncluttered rotor 46 is magnetically coupled to the PM rotor 38 instead of the armature 43. The machine 12 sees the PM rotor 38 as the rotating field. The PM rotor 38 produces a flux wave that is either stationary or rotating.

An n-phase flux path for the rotating air-gap flux is formed on one side of the uncluttered rotor 46 facing the PM rotor 38. On the other side of the uncluttered rotor 46, the 2*n non-continuous rings are formed by the step-up portions 50 of the magnetic brushes A, B, C and D (seen in FIGS. 4*a* and 4*b*). The n-phase secondary toroidal cores and coils 43 are coupled with the non-continuous rings for linking with the uncluttered fluxes that do not contain the rotation-frequency flux component.

The n-phase secondary toroidal coils can be connected to an inverter for speed controls in either a motor mode or a generator mode. Both modes can be with or without the field weakening mode. The uncluttered rotor 46 and the secondary toroidal cores and coils 43 are all parts of the secondary circuit. They are in the magnetic path of the permanent magnets 39 for controlling the air-gap flux density between the stator 43 and the PM rotor 38 for the field weakening and field enhancement modes, respectively. The PM rotor 38 can be operated in a motor mode or a generator mode depending on the control of the inverters connected to the stators 43 and 47.

The PM rotor 38, the uncluttered rotor 46, and the secondary toroidal cores and coils 43 form an uncluttered slip energy machine except the PM rotor 38 is acting as an armature that produces either a rotating or a standstill flux wave between the PM rotor 38 and the uncluttered rotor 46. For example, when the PM rotor 38 is standstill, the currents in the secondary toroidal coils 43 can produce a torque between the PM rotor 38 and the uncluttered rotor 46. Under a relative rotation between the uncluttered rotor 46 and the PM rotor 38, the secondary toroidal coils 43 can act as either a generator or a motor depending on the direction of current in the coils 43.

Figure 4C:
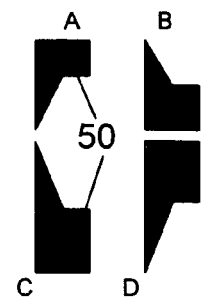
FIG. 4c is a detail view of the magnetic brushes included in the rotor of FIGS. 4a and 4b.
Figures 4A, 4B:
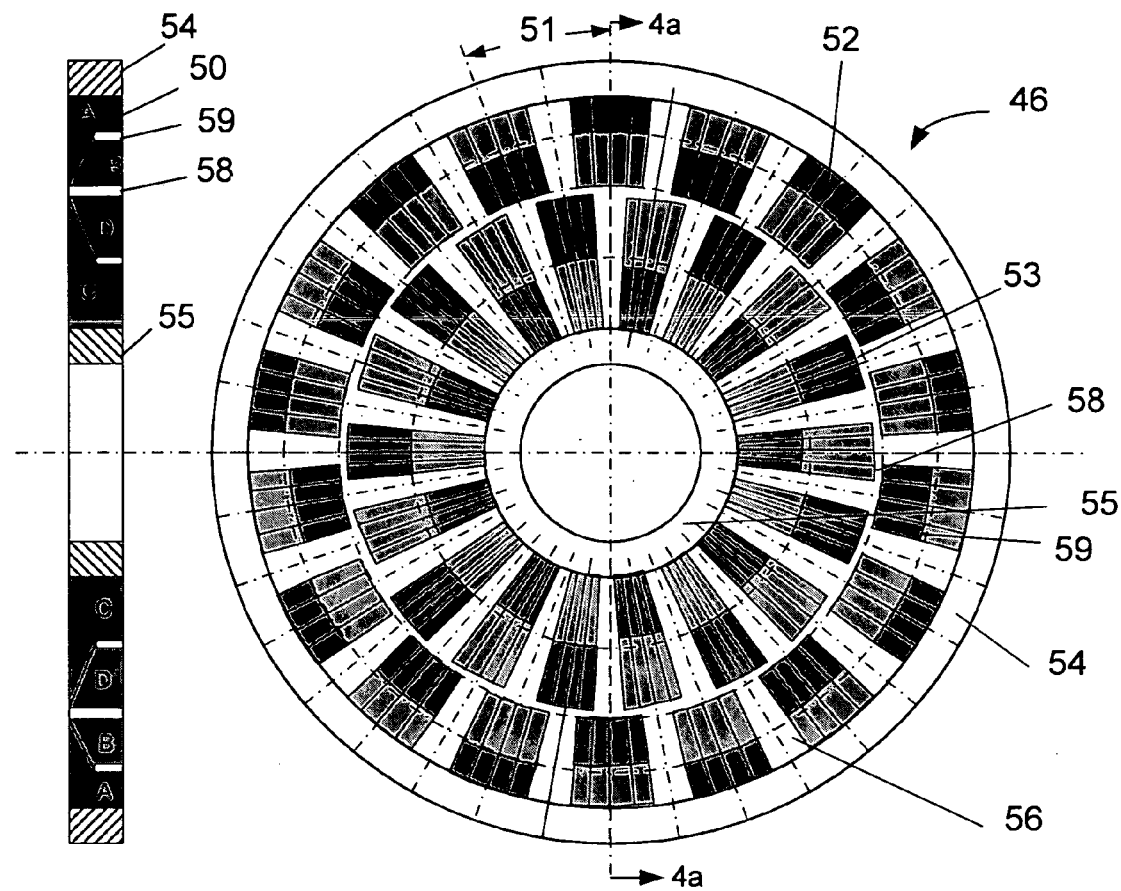
FIG. 4a is a sectional view taken in a plane indicated by line 4a-4a in FIG. 4b.
FIG. 4b is a plan view of a magnetic coupling, two-phase uncluttered in the machine seen in FIG. 1.

FIGS. 4*a*, 4*b* and 4*c* show the details of the first rotor 46 with magnetic brushes A, B, C and D for a 2-phase, eighteen pole device rotor. Using symbol, n, as the number of phases of the uncluttered rotor 46, each pole pair area (i.e., two times the pole-pitch 51) of the rotor consists of 2*n (i.e., 4) groups of magnetic brushes A, B, C and D. Two inner groups C, D of these four magnetic-brush groups A, B, C and D form one phase, and two outer groups A, B, form another phase. The detail views of these four groups of flux brushes, A, B, C, and D, are shown in FIG. 4*c*.

The magnetic brushes A, B, C and D can be made of stacked laminations, compressed powder cores, ferromagnetic wires or other equivalent soft magnetic materials that have good magnetic permeability, a high saturation level, and low core-loss properties. The magnetic brushes A, B, C and D are secured between the non-magnetic outer ring 54 and the non-magnetic rotor hub 55. A two-phase flux path for the rotating air-gap flux is formed on one side of the rotor 46 facing the permanent magnet rotor 39. On the other side of the rotor 46 are the step-up portions 50 (FIGS. 4*a* and 4*b*) of the magnetic brushes A, B, C and D that form four non-continuous rings. The rings are separated in a radial direction by ring-shaped gaps 58 (FIGS. 4*a* and 4*b*), which are made of material between each pair of magnetic brushes in each phase, each magnetic brush in the pair being separated on the secondary side from its counterpart magnetic brush by a ring-shaped air gap 59 (FIGS. 4*a* and 4*b*). The rings of magnetic brushes are interrupted by radial gaps 56 (FIG. 4*b*) between the magnetic-brush groups can be filled with non-magnetic materials. Because the summation of the opposite-polarity fluxes passing through the magnetic brushes per pole pair is zero, the boundary space of every pole pair can be made of electrically-conducting non-magnetic materials. This allows the rotor 46 to have sufficiently high mechanical strength required by certain designs. The outer ring 54 should be designed to withstand the centrifugal force of the rotor 46.

Figures 5A, 5B:
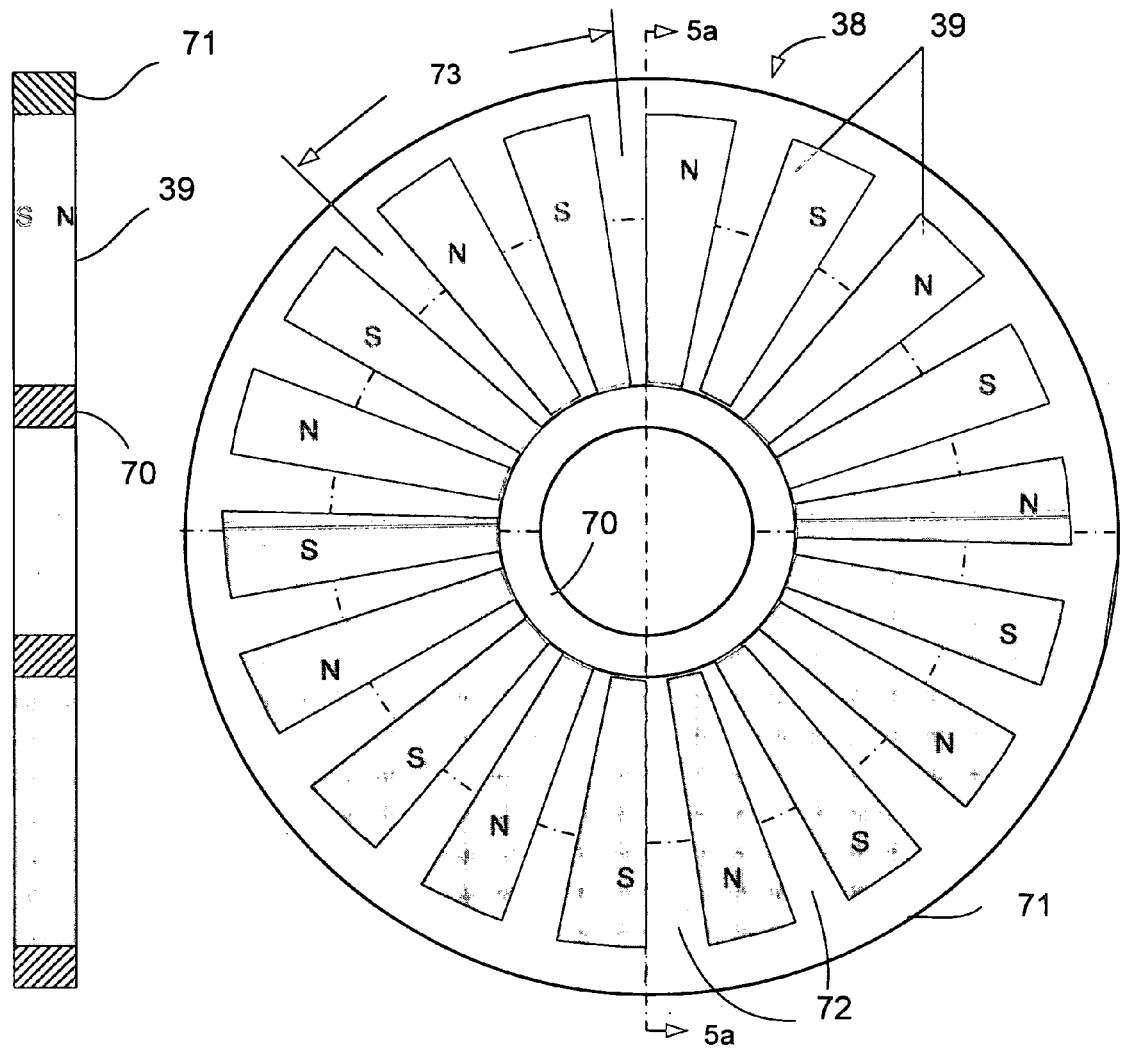
FIG. 5a is a sectional view taken in a plane indicated by line 5a-5a in FIG. 5b.
FIG. 5b is a plan view of a permanent magnet rotor in the two-phase machine seen in FIG. 1.

FIGS. 5*a*-5*b* show the permanent magnet (PM) rotor 38 with alternating north (N) and south (S) pole permanent magnets 39, one pair per pole pitch 73. The magnets are also oriented N-S or the reverse through the thickness of the PM rotor 38 as seen in FIG. 5*a*. The rotor has an inner ring 70 and an outer ring 71 and radial gap portions 72 formed of non-magnetic material.

Although the invention has been described in an embodiment with the ring gear coupled to the uncluttered rotor 46, in other embodiments the ring gear 23 can be coupled to the PM rotor 38 and the uncluttered rotor 46 can be coupled to the sun gear 27 and to the main drive shaft 20 driving the wheels 14.

In still other embodiments, a three shaft differential gear set can be substituted for the planetary gear set 22.

With the invention the electric machine can be operated as motor, as a generator or a field weakening region for speed above synchronous speed of the machine.

In the preferred embodiment, which is an axial gap machine, the primary air gap is disposed axially along an axis of rotation for the rotor and a second air gap is also disposed axially along an axis of rotation for the rotor. Radial gap embodiments can also be employed.

This has been a description of an example of the preferred embodiments of the invention. The present invention is intended to encompass additional embodiments including modifications to the details described above which would be apparent to one of ordinary skill in the art. To assist in defining the invention the following claims are provided.

I claim:

1. A power system for a motor vehicle having an internal combustion engine, the power system comprising:
   an electric machine further comprising:
      a stator having coils for receiving ac electrical power to provide a magnetic field;
      a permanent magnet rotor spaced from the stator to define a first air gap relative to an axis of rotation for the permanent magnet rotor;
      an uncluttered rotor spaced from the permanent magnet rotor to define a second air gap relative to an axis of rotation for the permanent magnet rotor;
      at least one secondary core assembly spaced from the uncluttered rotor by a third air gap wherein the secondary core assembly is disposed around an axis of rotation for the uncluttered rotor to allow induction of a slip energy current in the secondary core assembly without inducing a rotational energy current; and
   a gearing arrangement for coupling the internal combustion engine to wheels on the vehicle via the permanent magnet rotor and the uncluttered rotor thereby providing a means for the electric machine to both power assist and brake in relation to the output of the internal combustion engine.

2. The power system of claim 1, for operation with a battery, wherein power is transmitted through at least one of the group consisting of the stator and the secondary core assembly to charge the battery.

3. The power system of claim 1, wherein the gearing arrangement comprises a sun gear coupled to the wheels and to the permanent magnet rotor, a planetary gear set coupled to the internal combustion engine and arranged for rotation on said sun gear and a ring gear coupled to the uncluttered rotor arranged for rotation around the planetary gear set.

4. The power system of claim 3, further comprising a pin for insertion in said ring gear to allow not supplying active electric power to drive the wheels.

5. The power system of claim 1, wherein the electric machine is operated as motor.

6. The power system of claim 1, wherein the electric machine is operated as a generator.

7. The power system of claim 1, wherein the electric machine is operated in a field weakening region for speed above synchronous speed of the machine.

8. The power system of claim 1, wherein said first air gap is disposed axially along an axis of rotation for the permanent magnet rotor and said second air gap is disposed axially along an axis of rotation for the permanent magnet rotor.

9. A method of providing power to a vehicle wheel using a power system comprising the steps of:
   driving a ring gear coupled to an uncluttered rotor using planetary gears coupled to an engine thereby providing torque to a permanent magnet rotor coupled to the vehicle wheel and sun gear,
   combining torques of the uncluttered rotor and permanent magnet rotor using a counter torque in the uncluttered rotor to aid the planetary gear set in traveling around the sun gear, operating the power system in a mode selected from at least one of the group consisting of motoring mode, regenerative braking mode, and field weakening mode, decoupling the ring gear from the drive system by inserting a lock pin in the ring gear thereby taking the permanent magnet rotor and the electric machine out of the power system.

10. The method of claim 9, wherein a first axial air gap is located between a stator and the permanent magnet rotor, a second axial air gap is located between the permanent magnet rotor and the uncluttered rotor, and a third axial air gap is located between the uncluttered rotor and a secondary core assembly.

* * * * *